United States Patent [19]
Karppanen et al.

[11] Patent Number: 5,987,137
[45] Date of Patent: Nov. 16, 1999

[54] METHOD FOR THE ENCRYPTION OF DATA TRANSFER

[75] Inventors: Arto Karppanen, Helsinki; Hannu Kari, Veikkola; Jari Hämäläinen, Tampere; Jari Juopperi, Helsinki, all of Finland

[73] Assignee: Nokia Mobile Phones, Ltd., Espoo, Finland

[21] Appl. No.: 08/868,914

[22] Filed: Jun. 4, 1997

[30] Foreign Application Priority Data

Jun. 6, 1996 [FI] Finland ................................ 962352

[51] Int. Cl.$^6$ ................ H04L 9/28; H04L 9/06; H04L 9/00
[52] U.S. Cl. .................. 380/28; 380/9; 380/29; 380/37; 380/43; 380/48; 380/49
[58] Field of Search ..................... 380/9, 28, 29, 380/37, 43, 49, 23, 25, 48, 21

[56] References Cited

U.S. PATENT DOCUMENTS

| | | | |
|---|---|---|---|
| 5,099,517 | 3/1992 | Gupta et al. | 380/29 |
| 5,161,193 | 11/1992 | Lampson et al. | 380/49 |
| 5,235,644 | 8/1993 | Gupta et al. | 380/48 |
| 5,257,257 | 10/1993 | Chen et al. | |
| 5,319,712 | 6/1994 | Finkelstein et al. | 380/44 |
| 5,455,863 | 10/1995 | Brown et al. | 380/23 |
| 5,640,395 | 6/1997 | Hamalainen et al. | |

FOREIGN PATENT DOCUMENTS

| | | |
|---|---|---|
| 0464565A2 | 1/1992 | European Pat. Off. . |
| 0689316 A2 | 12/1995 | European Pat. Off. . |
| WO 95/10684 | 1/1995 | WIPO . |
| WO 95/12264 | 5/1995 | WIPO . |

*Primary Examiner*—Bernarr E. Gregory
*Attorney, Agent, or Firm*—Perman & Green, LLP

[57] ABSTRACT

The object of the invention is a method for the encryption of information transferred between data transfer devices (MS, SGSN) in a data communication system wherein one or more data frames are created from one or more data packets formed from the information by the application. The data frames comprise at least a header field and a data field. In the method, at least some part of the data packets is ciphered by using a ciphering key (Kc). To the data frames, synchronization data (COUNT) is attached, the value of which is changed at least at the transmission of each data frame.

21 Claims, 8 Drawing Sheets

Fig. 5a

| Frame header | | Information field | Check sequence |
|---|---|---|---|
| TLLI 3 oct | Control 2 oct | I-block 0 to N | FCS 2 oct |

Fig. 5b

| | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| Information + Supervisory | C/R | S1 | S2 | | | N(S) | | | | P/F | | | N(R) | | | |

Fig. 5c

| Supervisory | C/R | S1 | S2 | 0 | 1 | 1 | 1 | 1 | 1 | P/F | | | N(R) | | | |
|---|---|---|---|---|---|---|---|---|---|---|---|---|---|---|---|---|

Fig. 5d

| Unnumbered | C/R | x | x | 1 | 1 | 1 | 1 | 1 | 1 | P/F | | M1-5 | | | G/D | |
|---|---|---|---|---|---|---|---|---|---|---|---|---|---|---|---|---|

| Bit | 8 | 7 | 6 | 5 | 4 | 3 | 2 | 1 |
|---|---|---|---|---|---|---|---|---|
| Oct 1 | M | E | Pri | | | NLSI | | |
| 2 | SDU number (optional) | | | | | | | |
| ... | Data segment | | | | | | | |
| N | | | | | | | | |

Fig. 6a

| Bit | 8 | 7 | 6 | 5 | 4 | 3 | 2 | 1 |
|---|---|---|---|---|---|---|---|---|
| Oct 1 | M | E | Pri | | | NLSI | | |
| 2 | SDU number | | | | | | | |
| ... | Data segment | | | | | | | |
| N | | | | | | | | |

Fig. 6b

METHOD FOR THE ENCRYPTION OF DATA TRANSFER

BACKGROUND OF THE INVENTION

The present invention relates to a method for the encryption of information being transferred between data communication devices in a data communication system wherein one or more data frames are formed from one or more data packets formed from the infomation by an application, and these data frames comprise at least a header field and a data field. The invention relates additionally to a data communication system which comprises the means for the encryption of information being transferred between data transfer devices, the means for forming one or more data packets from the information and the means for forming data frames from the data packets.

Data transfer between separate data transfer devices can be achieved in such a way that those data transfer devices between which data at that time is to be transferred, are linked together for the time needed for the data transfer. In such a case, the link is maintained until the user stops the data transfer. In such cases, most part of the linkage time is spent in entering commands provided by the user and only a small part of the time is actual data transfer. This limits, for example, the maximum number of simultaneous users. Another possibility is to exploit a so-called packet switched data transmission. In this case, data is transferred between data transfer devices in a packet mode, in which case the time between the packets is freely available and can be used by other data transfer devices. In this case, the number of simultaneous users can be increased, especially in wireless data transfer networks, such as cellular networks, since in this case the mobile stations which are in the same cellular area can use the same transfer channel. One such a cellular system is the GSM system (Group Special Mobile) for which a packet mode data transfer service GPRS (General Packet Radio Service) has been developed. FIG. 1 shows a block diagram of principal blocks in the operation of the GPRS system. A packet switching controller SGSN (Serving GPRS Support Node) controls the operation of packet switching service on the cellular network side. The packet switching controller SGSN controls the sign-on and sign-off of the mobile station MS, the updating of the location of the mobile station MS and the routing of data packets to their correct destinations. The mobile station MS is connected to the base station subsystem BSS through a radio interface Um (FIG. 1). The base station subsystem is connected to the packet switching controller SGSN through the BSS-SGSN interface Gb. In the base station subsystem BSS, the base station BTS and the base station controller BSC have been connected to each other by a BTS-BSC interface Abis. The location of the packet switching controller SGSN in the mobile station network can vary, for example, according to which technical implementation is being used. Although in FIG. 1, the packet switching controller SGSN has been marked outside the base station subsystem BSS, the packet switching controller SGSN can be placed, for example, as a part of the base station BTS connected to the base station subsystem BSS or as a part of the base station controller BSC.

The GPRS system has been described, for example, in draft proposals GSM 01.60, GSM 02.60, GSM 03.60 and GSM 04.60 which have been dated prior to the application date of the present invention.

The operation of both the mobile station MS and the packet switching controller SGSN can be divided into various layers, each providing a different function, as has been shown in FIG. 2. The International Standardisation Organisation, ISO, has formulated an OSI model (Open Systems Interconnection) for grouping data transfer into different functional layers. In this model, there are seven layers which are not necessarily needed in all data communication systems.

Transferable information, such as control signalling and data transmitted by the user, between a mobile station MS and a packet switching controller SGSN is exchanged preferably in a data frame mode. The data frame of each layer consists of a header field and a data field. FIG. 2 shows also the structure of data frames being used in the GPRS system in different layers.

The information contained in the data field can be, for example, data entered by the user of the mobile station or signalling data. The data field may contain confidential information which has to be secured as reliably as possible before transmitting it to the radio path. In such a case, the encryption has to be executed in such a way that in all simultaneous connections between the packet switching controller SGSN and mobile stations MS connected to it, a separate encryption key is used. Conversely, it is not preferable to cipher the address data of the data frame by the same encryption key used in the ciphering of the data field, since mobile stations MS use a shared radio path resource, i.e. information in many different connections is transferred in the same channel, for example, at different time intervals. In this case, each mobile station should receive all messages transmitted in the channel concerned and decrypt at least the encryption of the address data to identify to which mobile station the message is intended. Also the packet switching controller SGSN does not know which encryption key should be used.

In the following, the operational functions of the layers of the GPRS system have been presented.

The lowest layer is called an MAC layer (Media Access Control) which controls the use of the radio path in the communication between the mobile station MS and the base station subsystem BSS, such as allocating channels for transmitting and receiving packets.

Data transmission between the base station subsystem and the packet controller SGSN in the lowest level is executed at the L2 layer (link layer) in which link layer protocol is used, such as LAPD protocol according to standard Q.921, frame relay protocol or the equivalent. The L2 layer may additionally contain also quality or routing data according to GPRS specifications. Layer L2 has properties of the physical layer and the link layer of the OSI model. The physical transmission line between the base station subsystem BSS and the packet controller SGSN depends, for example, on where the packet controller SGSN has been located in the system.

Above the MAC layer, there is an RLC layer (Radio Link Control) and its function is to divide the data frames formed by the LLC layer into fixed sized packets to be transmitted to the radio path and their transmission and retransmission when necessary. The length of the packets in the GRPS system is the length of one GSM time slot (approximately 0.577 ms).

LLC layer (Logical Link Control) provides a reliable transmission link between the mobile station MS and the packet controller SGSN. The LLC layer, for example, adds to the transmitted message error checking data by means of which it is intended to correct those uncorrectly received messages and when necessary, the message can be retransmitted.

SNDC layer (Sub-Network Dependent Convergence) comprises functions like protocol conversions of transmitted information, compression, segmentation and segmentation of messages coming from the upper layer. Additionally, ciphering and deciphering are accomplished at the SNDC layer. The structure of the SNDC frame has been presented also in FIG. 2. The SNDC frame comprises an SNDC header field (SNDC header) and an SNDC data field (SNDC data). The SNDC header field consists of protocol data (Network Layer Service access point Identity, NLSI) and of SNDC control data, such as determinations of compression, segmentation and ciphering. The SNDC layer functions as a protocol adapter between protocols used at the upper level and the protocol of the LLC layer (link layer).

The transmitted information comes preferably as data packets to the SNDC layer from some application, such as messages according to the GPRS system or packets of the Internet protocol (IP). The application can be, for example, a data application of a mobile station, a telecopy application, a computer program which has a data transmission link to a mobile station, etc.

The MAC layer, RLC layer, LLC layer and the L2 layer contain properties which are described at layer 2 in the OSI model. The above mentioned layers and the layers described in the OSI model are not, however, distinctly coherent.

The SNDC frame is transferred to the LLC layer where an LLC header field is added to the frame. The LLC header field consists of a Temporary Logical Link Identity (TLLI) and an LLC control part. The packet controller GPRS establishes a TLLI identity for each data transmission link between a mobile station MS and a packet controller GPRS. This data is used in data transmission for defining which data transmission link each message belongs to. Simultaneously, the same TLLI identity can only be used in one data transmission link. After the termination of the link, the TLLI identity used in the link can be allocated to a new link to be subsequently formed. The LLC control part defines the frame number and the command type (info, acknowledge, retransmission request etc.) for ensuring an error free data transfer.

Ciphering in the GSM system is executed at the physical layer as a bit per bit ciphering, i.e. bit stream transmitted to the radio path is formed by summing to the transmitted data ciphering bits which are formed by using algorithm A5 known per se, by using a ciphering key Kc. Algorithm A5 ciphers transmitted data and signalling information at the physical layer on the channels dedicated to data transfer (Traffic Channel, TCH or Dedicated Control Channel, DCCH).

Synchronization of transmitted messages is ensured in such a way that algorithm 5 is driven by means of a special synchronization data (COUNT). The synchronization data COUNT is formed on the basis of a TDMA frame number. Then the contents of each 114-bit block formed by algorithm A5 depend only on the frame numbering and the ciphering key Kc.

The setting of the ciphering key Kc is most preferably executed at the stage when the communication traffic of the dedicated channel has not yet been encrypted and the mobile station network being used has identified the mobile station MS. In the identification in the GSM system, an International Mobile Subscriber Identity, IMSI, is used which identifies the mobile station and which has been stored in the mobile station, or a Temporary Mobile Subscriber Identity, TMSI, is used which has been formed on the basis of the subscriber identity. In a mobile station, also a subscriber identification key, Ki, has been stored. The subscriber identification key Ki is also known by the mobile station network.

To ensure that the ciphering key Kc is known only by the mobile station MS and the mobile station network, the transmission of the ciphering key from the base station subsystem BSS to the mobile station MS is indirect. Then, in the base station subsystem BSS, a Random Access Number, RAND, is formed which is transmitted to the mobile station MS. The ciphering key Kc is formed from the random access number RAND and from the subscriber identification key Ki by using algorithm A8, as has been shown in FIG. 3. The calculation and storing of the ciphering key Kc are executed both in the mobile station MS and in the mobile station network.

Data transfer between the mobile station MS and the base station subsystem BSS is nonciphered at the start of the connection. The transition to the ciphered mode proceeds preferably in such a way that the base station subsystem BSS transmits to the mobile station a certain command (unciphered) which in this context is called the "start cipher". After the mobile station MS has received the command "start cipher", it starts the enciphering of the transmitted messages and deciphering of the received messages. Correspondingly, the base station subsystem BSS starts the enciphering of messages transmitted to the mobile station after the base station subsystem has received the ciphered message transmitted by the mobile station and deciphered the ciphering correctly.

In the above described ciphering, the synchronization was based, for example, on the TDMA frame numbering of the physical layer. It is not possible to use it in all applications, particularly when information belonging to different connections is transmitted on the same channel, such as in packet switched data transmission methods.

In the European patent application EP-0 689 316, a method has been presented for the encryption of data transfer wherein, for example, encryption data which comprises an encryption key is attached to the transmitted data frames. A U.S. Pat. No. 5,319,712 comprises a method and equipment for the encryption of data transfer so that a sequence number is attached to the data frames of the link layer and the data frame is ciphered. A disadvantage of these ciphering methods according to the prior art is, for example, that the receiver does not know without deciphering, to whom the received data frame is intended, in which case the unnecessary reception of data frames and deciphering causes a deterioration in the efficiency of the system.

SUMMARY OF THE INVENTION

The aim of the present invention is to provide a method and equipment for the encryption of data transfer in a data transfer system wherein the transferred data is in a data frame mode and which data transfer system has been divided into functional layers in which case the data frame structure can be different in the different layers. The method according to the invention is characterized in that at least some part of the data packets is ciphered by a ciphering key and that synchronization data is attached to the data frames and its value is changed at least at the transmission of each data frame. The system according to the invention is characterized in that the means for ciphering the information comprise at least:

means for ciphering data packets with a ciphering key,
means for attaching synchronization data to the data frames, means for changing the value of the synchronization data at the transmission of each data frame, and means for interpreting the synchronization data in the data transfer device of the receiver.

Considerable advantages are achieved by the invention, compared to the ciphering methods according to the prior art. In the method according to the invention, the header field of the data frame of the physical layer can be transmitted in a non-ciphered mode, or methods which are presently known can be used in the ciphering. In the method according to the preferable embodiment of the invention, the ciphering key is changed for each transmission block of the physical layer, in which case deciphering without knowledge about the ciphering key is virtually impossible. By using the method according to the invention, it is possible additionally to implement a partial enciphering, in which case only a part of the transmitted data frames is ciphered. In this case, for example, advertisements can be delivered non-ciphered and other information ciphered only to those who have the right to receive ciphered data frames and to decipher them.

BRIEF DESCRIPTION OF THE DRAWING

The invention is described in more detail in the following by referring to the attached drawings in which FIGS. 5a–5d show the data frame structure of the link layer according to an embodiment, FIG. 6a shows the data frame structure of the adapting layer according to an embodiment with Point-to-Point connection, and FIG. 6b shows the data frame structure of the adapting layer according to an embodiment with multipoint connection.

DETAILED DESCRIPTION OF THE INVENTION

Figure 1:
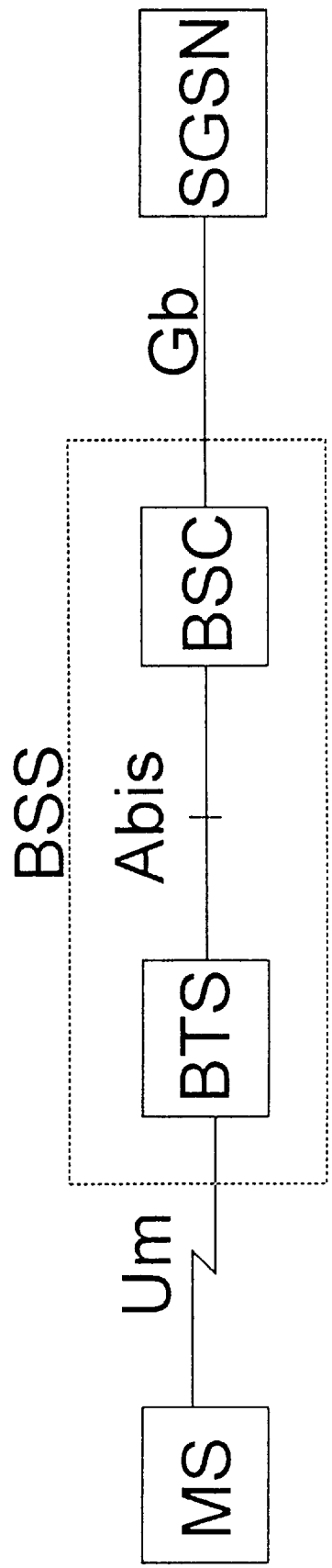
FIG. 1 shows the logical structure of the GPRS system as a schematic block diagram.
Figure 2:
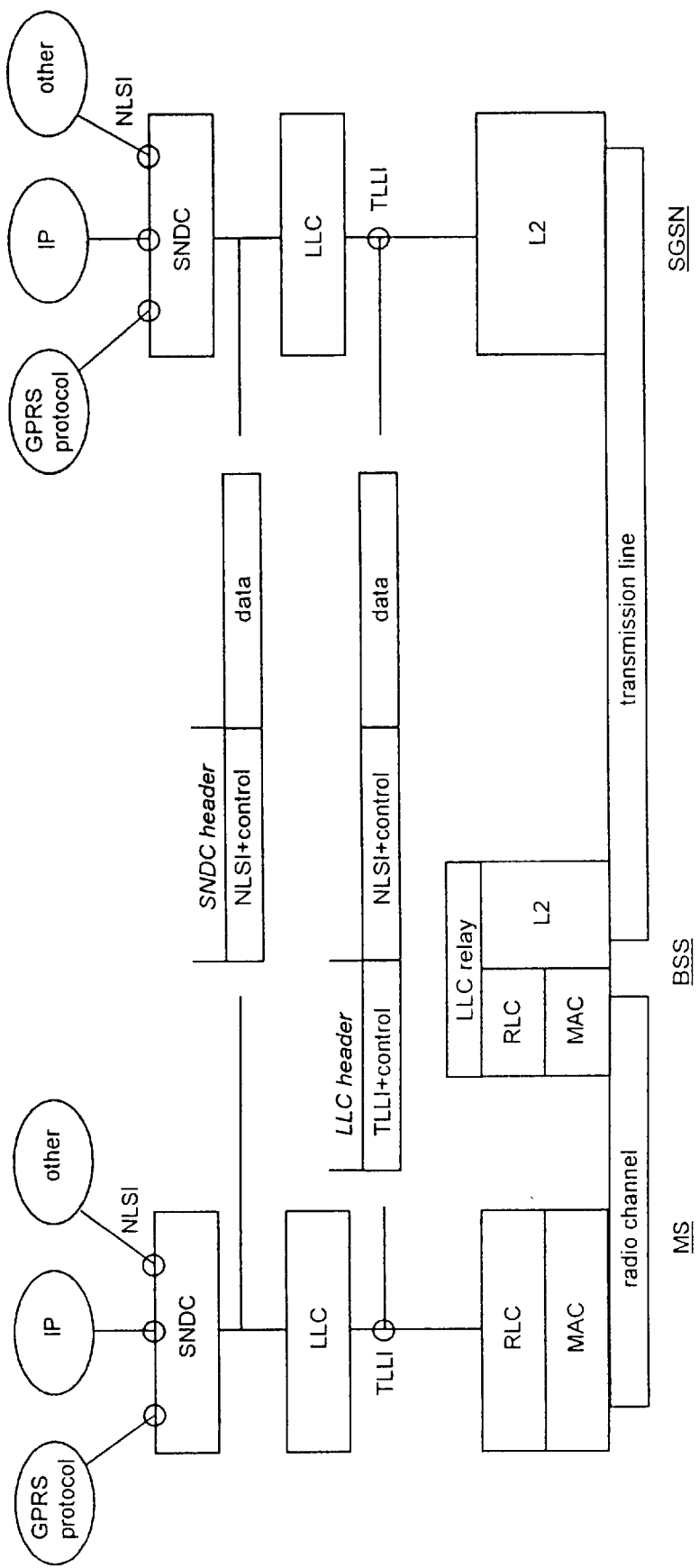
FIG. 2 shows the layer structure of the GPRS system and the data frame structure of the layers.
Figure 3:
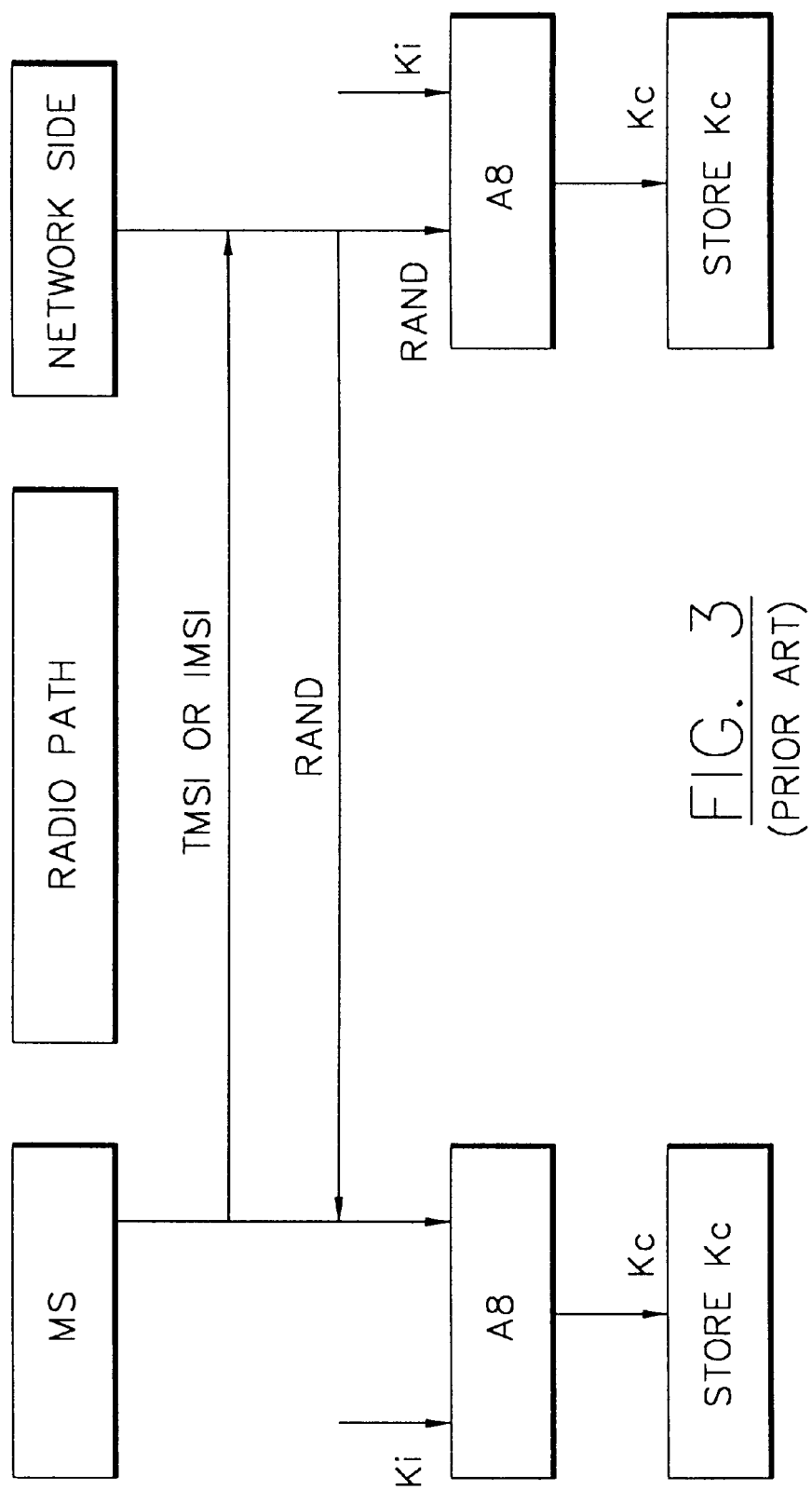
FIG. 3 shows definition of the ciphering key according to the prior art in mobile stations and in a mobile station network as a schematic block diagram.

In the following, the invention has been visualized by means of a packet switching service GPRS implemented in the GSM system, but the invention has not, however, been limited only to this system.

In the invention, one has aimed at the implementation wherein as much as possible of the existing ciphering technique is exploited, such as the ciphering of the GSM system which is adjusted so that it can be applied in the transmission of data frames, for example, in the GPRS system. One advantage of the invention is that it can be applied in many operational modes, such as the Point-to-Point, PTP, connection, multipoint connection (Point-to-Multipoint-Multicast, PTM-M; Point-to-Multipoint-Group, PTM-G) etc. The ciphering methods are classified mainly on the basis of the TLLI identity. A distinct TLLI identity is allocated for each connection type between the mobile station MS and the packet switching controller SGSN. The following different types are available for use in the GPRS system according to present standards:

Point-to-Point (PTP) uses unique TLLI identity in the communication between the mobile station MS and the packet switching controller SGSN.

Point-to-Multipoint-Multicast (PTM-M) uses TLLI allocated for the communication between the mobile station MS and the multicast service provider.

Point-to-Multipoint-Group (PTM-G) uses TLLI allocated for mutual communication via multicast service provider of mobile stations MS within the mobile station group.

Point-to-Point connection typically uses the acknowledged mode at the link layer level, i.e. the receiver of the transmission transmits data as an acknowledgement of a correct reception. At Point-to-Multipoint connections, data frames are usually transmitted by using operation mode in which acknowledgements are not transmitted.

As already has been stated earlier in this description, in systems where data of different connections is transmitted in the same channel, it is not preferable to cipher the header field of data frames by a unique ciphering key for each connection. In this case, the data, frames are ciphered at least partly at some other layer than the physical layer. In the GPRS system, the ciphering is executed at the LLC layer. The transmitted data is ciphered in such a way that to each bit of the data frame, a corresponding bit of the ciphering bit string is summed. The ciphering bit string has been formed preferably by a ciphering algorithm by using an individual and unique ciphering key Kc. The ciphering algorithm is, for example, the A5 algorithm known from the GSM system.

In addition to the correct address, one has to ensure that the data frames can be sequenced in the receiver. This can be implemented in a manner known per se, so that synchronization data COUNT is entered into the ciphering algorithm, in which case the receiver is able, after deciphering, to find out the sequence of the data frames. For example, in TDMA systems (Time Division Multiple Access), like GSM, the TDMA frame number can be used for numbering the data frames of the physical layer. However, the packet switching controller SGSN of the GPRS system does not know the TDMA frame number, so in this invention a method has been developed for synchronizing data frames, and in this method the sequence number of data frames (data frame number) is used as a synchronization data. Thus the contents of each transmitted block are determined by, for example, the frame numbering and the ciphering key Kc.

The amount of data to be ciphered varies in different connections, but this is not significant in the application of the invention since the ciphering can be executed by dividing the transmitted data preferably into sub-blocks of standard length. Then the first bit of each sub-block is ciphered by the first bit of the ciphering algorithm, the second bit of the sub-block by the second bit of the ciphering algorithm etc. In the GPRS system, the length of a sub-block can be, for example, 114 bits, such as in the present GSM system. The length of the sub-block can be, preferably, also divisible by the length of a byte. In many applications, the length of the byte is eight, in which case a suitable length for a sub-block could be 64 bits.

Figure 4A:
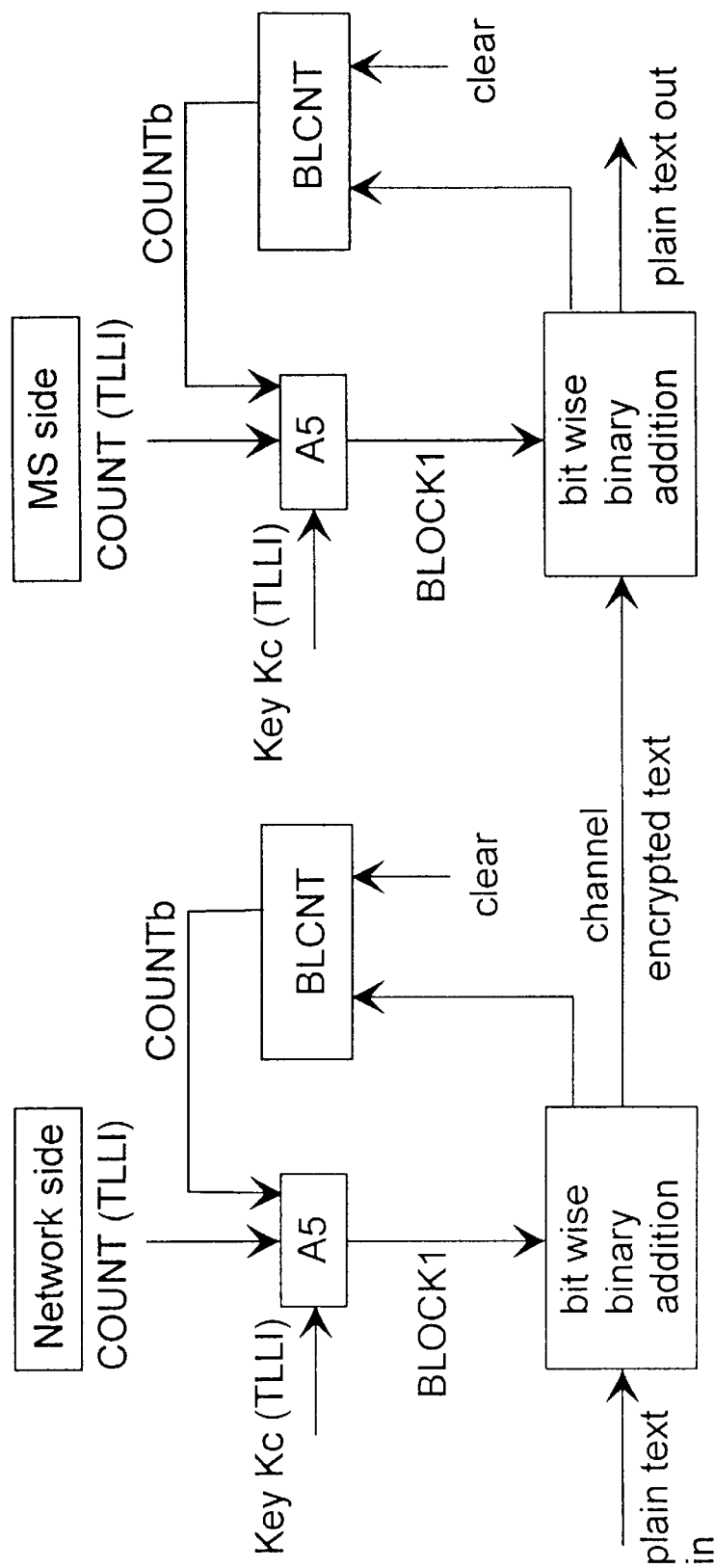
FIG. 4a shows ciphering according to a preferable embodiment of the invention.
Figure 4B:
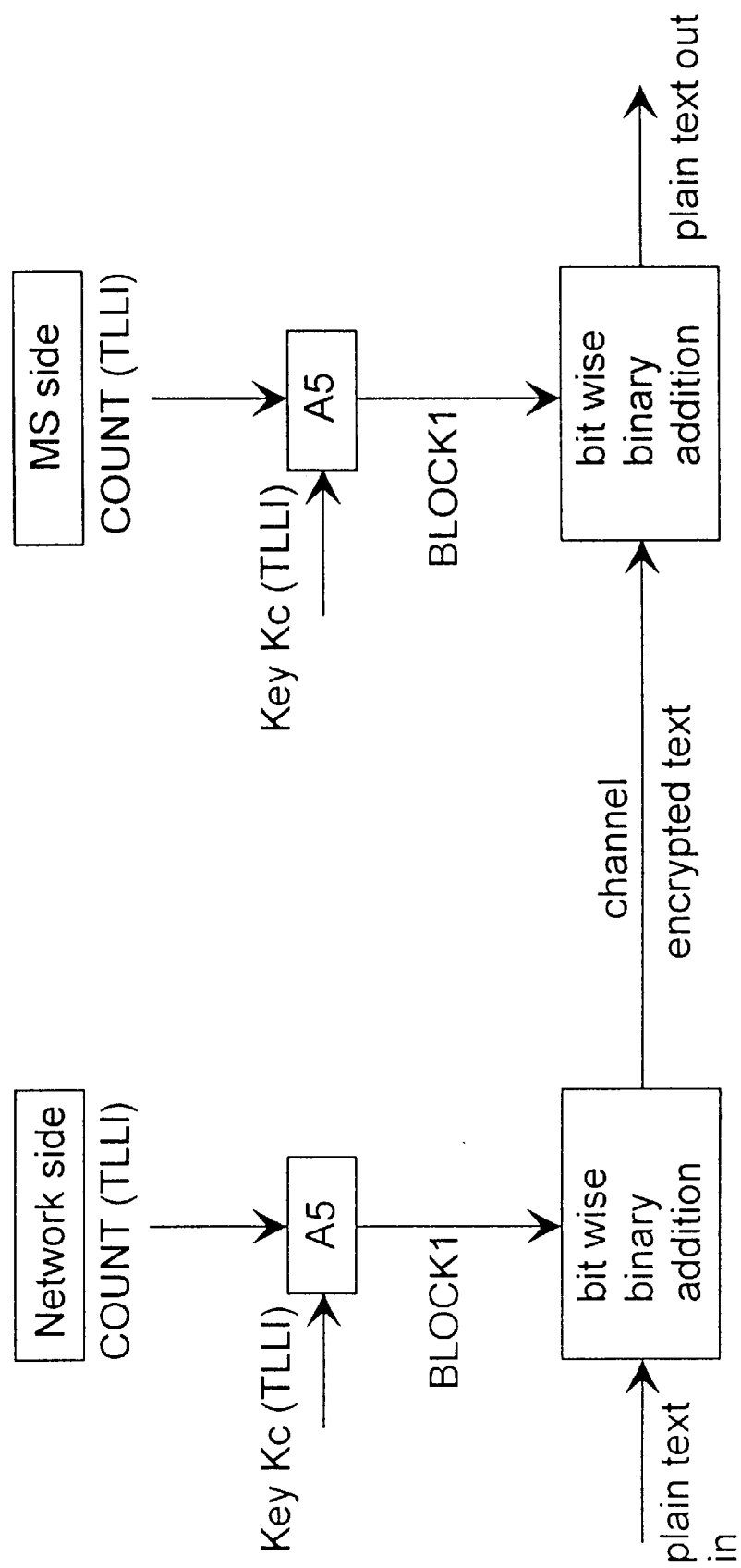
FIG. 4b shows ciphering according to another preferable embodiment of the invention.

In the GSM system, a mobile station MS can use only one ciphering key Kc at a time. In the GPRS system, one ciphering key per mobile station MS is not necessarily sufficient in every situation, since the mobile station can simultaneously have many different types of active connections (PTP, PTM) with each connection having most preferably a separate ciphering key Kc which has been preferably formed by different means. The ciphered data frame contains thus the ciphering key Kc being used, the synchronization data COUNT and possibly also the values COUNTb of a block counter BLCNT attached to the TLLI. FIG. 4a shows a preferable ciphering method according to the invention as a schematic block diagram in a situation where a non-encrypted sub-block (plain text in) is transferred encrypted (encrypted text) from the network to the mobile station. In this embodiment, also the value COUNTb of the block counter is used in the determination of the ciphering block BLOCK 1. The block counter can be set to its initial value by means of a setting line "clear", preferably at the start of the data frame of each adapting layer. Both at the network side and in the mobile station MS, the value of the synchronization data COUNT is calculated for each transmitted block, with the value of the synchronization data COUNT and the ciphering key Kc entered into the ciphering algorithm A5. At the transmission side, the output bit string (BLOCK1) is summed to the sub-block (plain text in). The encrypted sub-block is transferred in the channel to the mobile station MS. The mobile station MS deciphers it correspondingly by summing the output bit string (BLOCK1) of the ciphering algorithm A5 to the received encrypted sub-block and, as a result of the summing, a non-encrypted sub-block (plain text out) corresponding to the transmitted sub-block is obtained. FIG. 4b shows another preferable ciphering method according to the invention as a schematic block diagram. This embodiment differs from the embodiment of FIG. 4a mainly in that the block counter BLCNT is not used.

A typical length of a frame sequence number is from six to eight bits. From the ciphering security point of view, this value as COUNT variable alone is not sufficient, and therefore also other variables can be used in the determination of the COUNT value of the synchronization data in addition to the frame sequence number, for example, the base station identification. The base station identification is known by both the network and the mobile station, since the mobile station, which is being used, notifies the packet switching controller SGSN about the changing of the base station. The changing of the base station alters thus the COUNT value of the synchronization data in this embodiment.

In the Point-to-Point connection mode, the following variables are available in the determination of the COUNT value of the synchronization data:

a) The frame number of the Logical Link Control layer (LLC frame number, LLC #) which is conveyed to the adapting layer (SNDC).

b) The data frame number of the adapting layer (SNDC data block number, SDU#) which can be attached to the transmitted data frame or initialized at the start of the connection when it is maintained at both ends of the connection.

c) Identity of a routing area (Routing area #) which is known at both ends of the connection so that the identity need not be attached to the transmitted data frame.

d) Identity of the area of a packet switching controller (SGSN #) which is known at both ends of the connection so that the identity need not be attached to the transmitted data frame.

e) Identity of a base station (Cell #) which is known at both ends of the connection so that the identity need not be attached to the transmitted data frame.

In Point-to-Multipoint connection mode, the following variables are available in the determination of the COUNT value of the synchronization data:

a) The data frame number of the adapting layer (SNDC data block number, SDU #) which is transmitted within the SNDC data frame.

b) Identity of a routing area (Routing area #) which is known at both ends of the connection so that the identity need not be attached to the transmitted data frame.

c) Identity of the area of a packet switching controller (SGSN #) which is known at both ends of the connection so that the identity need not be attached to the transmitted data frame.

d) Identity of a base station (Cell #) which is known at both ends of the connection so that the identity need not be attached to the transmitted data frame.

Additionally, in both connection modes, the value of the block counter BLCNT can be used, which makes cracking of an encrypted data field even more difficult for an intruder, since the same ciphering bit string is not used in the encryption of sequential data fields. Otherwise, the recalculation is executed only once for each transmission of a data frame of the adapting layer. The length of the data frame of the adapting layer can be thousands of bits, so that it may be possible to find out the encryption key if the encryption algorithm is not calculated sufficiently often.

The above presented variables defining the synchronization data COUNT can either be used alone or in combination. Some of the variables thus have to be delivered to the receiver within data frames and some of them can be managed locally. The use of locally managed variables increases the level of the security and to some extent it reduces the amount of transferred data. The following tables give an example of the contents of the synchronization data COUNT. Table 1.1 shows some synchronization data according to the most preferable embodiment of the invention and in it, a block counter BLCNT has been used, and table 1.2 shows another preferable embodiment of the invention and in it, the identity of the base station has been used instead of the value of the block counter COUNTb.

TABLE 1.1

| Bit/mode | 22 | 21 | 20 | 19 | 18 | 17 | 16 | 15 | 14 | 13 | 12 | 11 | 10 | 9 | 8 | 7 | 6 | 5 | 4 | 3 | 2 | 1 |
|---|---|---|---|---|---|---|---|---|---|---|---|---|---|---|---|---|---|---|---|---|---|---|
| PTP | SDU # (local or delivered) | | | | | | | LLC # (delivered) | | | | | | | COUNTb | | | | | | | |
| PTM | SDU # (delivered) | | | | | | | 1 | 1 | 1 | 1 | 1 | 1 | | COUNTb | | | | | | | |

TABLE 1.2

| Bit/mode | 22 | 21 | 20 | 19 | 18 | 17 | 16 | 15 | 14 | 13 | 12 | 11 | 10 | 9 | 8 | 7 | 6 | 5 | 4 | 3 | 2 | 1 |
|---|---|---|---|---|---|---|---|---|---|---|---|---|---|---|---|---|---|---|---|---|---|---|
| PTP | SDU # (local or delivered) | | | | | | | | LLC # (delivered) | | | | | | Cell #, Routing area # or SGSN # (local) | | | | | | | |
| PTM | SDU # (delivered) | | | | | | | | 1 | 1 | 1 | 1 | 1 | 1 | Cell #, Routing area # or SGSN # (local) | | | | | | | |

In the following, the setting of the ciphering key Kc is described. The setting of the ciphering key Kc is initiated by the network as often as the network operator finds it necessary. Additionally, a unique ciphering key has to be generated for each TLLI connection. A table of the ciphering key Kc-TLLI identity pairs is most preferably maintained both in the packet switching controller GPRS and in the mobile station MS. The setting of the ciphering key is different for different connection types.

In a Point-to-Point connection, the ciphering key Kc is transmitted indirectly by using a random access number RAND. The ciphering key Kc is formed in the GPRS system preferably from the random access number RAND and from the subscriber identification key Ki of the mobile station by using the algorithm A8, just as in the GSM system. The identification key of a mobile station has been stored on the SIM card (Subscriber Identity Module) of the mobile station and in the Authentication Centre AuC of the network.

In a multipoint connection, all mobile stations which are connected to the same service use the same ciphering key Kc. The ciphering key Kc is activated when the connection to the service is created. The ciphering key Kc can be entered to the mobile station MS by using different methods. A multipoint service provider can enter the ciphering key, for example, in a ciphered mode, in which case the mobile station MS has to be logged to the packet switching controller GPRS through a Point-to-Point connection prior to gaining access to the multipoint connection. During the logon stage of the Point-to-Point connection, a ciphering key Kc has been defined for the connection and it is used in the encryption of the ciphering key of the multipoint connection when it is transmitted to the mobile station MS.

The ciphering key of the multipoint connection can also be entered, for example, by using the keypad of the mobile station MS, such as, for example, a PIN code, or a kind of SIM card can be used where, among other parameters, the ciphering key Kc has been stored.

The ciphering key Kc need not be regenerated when the mobile station MS changes its location to the area of another packet switching controller GPRS because the ciphering key can be delivered from the previous packet switching controller to the new one.

The transition from clear text mode to ciphered mode proceeds preferably in such a way that the packet switching controller GPRS transmits in clear text a special "start cipher" command. In the mobile station MS, the enciphering of the transmission and the deciphering of the receiving start after the "start cipher" command has been correctly received by the mobile station. On the packet switching controller GPRS side, the enciphering starts correspondingly after the packet switching controller has received the message transmitted by the mobile station MS and deciphered it. The above described operation corresponds, in its main parts, to the start of the enciphering of the GSM system.

In some packet switching applications, ciphering can be applied also in such a way that only messages going in one direction are ciphered, i.e. messages from the mobile station MS to the packet switching controller GPRS or from the packet switching controller GPRS to the mobile station MS. Applications like this include, for example, delivering of advertisements which are usually transmitted non-ciphered.

Additionally, ciphering according to the invention can be applied also in such a way that only some part of the transmitted data frames of the adapting layer SNDC is ciphered. In this case, one encryption bit is most preferably added to the data frame of the adapting layer and it will indicate whether the data frame concerned is ciphered or non-ciphered. For example, when the encryption bit has the value zero, the data frame is non-ciphered and when the encryption bit has the value one, the data frame is ciphered. This can be used, for example, in situations where the access rights to a service require registration or the equivalent, in which case the registered users can decipher the ciphered data frames. For other users, the service provider can deliver information concerning services and advertisements in non-ciphered data frames.

FIG. 5a shows an example of a data frame structure of a link layer according to a preferable embodiment. The header field of the data frame (frame header) comprises a TLLI identity of three bytes and a control part (Control) of two bytes. A byte comprises, as is known per se, eight binary information (bits).

The information field of the data frame comprises the transmitted information. The length of the information field may vary. The data frame also contains a check field (Check sequence) of two bytes which includes, for example, error correction information.

FIG. 5b shows the structure of the control part of the data frame of FIG. 5a when the data frame is an information delivery and system supervisory data frame (Information+ supervisory) wherein:

C/R indicates whether it is a question of a command or a response (Command/Response), S1 and S2 describe the type of the supervisory command, N(S) is the number of the sending sequence (Send sequence number), P/F indicates whether it is a question of a confirmation request message (P) or a confirmation message (F) (Poll/Final), and N(R) is the number of the reception sequence (Receive sequence number).

FIG. 5c shows the structure of the control part of the data frame of FIG. 5a when the data frame is a system supervisory data frame (Supervisory). The significance of bits has been described above.

FIG. 5d shows the structure of the control part of the data frame of FIG. 5a when the data frame is an unnumbered data frame (Unnumbered) wherein:

M 1-5 are unnumbered commands and responses,

G/D indicates whether it is a question of a control or a data frame (Control/Data), and x-bits are not significant.

FIG. 6a shows an example of a data frame structure with a Point-to-Point connection of an adapting layer according to a preferable embodiment. The first byte contains control data in which:

M indicates whether it is a question of the last segment of the information formed by the application, E indicates whether the ciphering is in use, Pri indicates the priority classification, NLSI is protocol data which can be, for example,

TCP/IP,

CLNP,

X0.25,

GPRS, etc.

FIG. 6b shows an example of a data frame structure with a multipoint connection of an adapting layer according to a preferable embodiment. The significance of bits has been described above.

Although the invention has been described above in a data transfer system where mobile stations MS, base station subsystems BSS and packet switching controllers SGSN of a GPRS system are used, the invention can be applied also in other data transfer systems, such as TDMA and CDMA data transfer systems, most preferably in packet switching data transfer systems.

The invention has not been limited only to the above presented embodiments, but it can be modified within the scope of the attached claims.

What is claimed is:

1. A method for the encryption of information transferred between data transfer devices in a data communication system wherein plural data frames are created from one or more data packets formed from the information by a communication application, and individual ones of these data frames comprise at least a header field and a data field, wherein the method comprises steps of:

ciphering at least one part of the data packets by using a ciphering key;

attaching synchronization data to the data frames, wherein the synchronization data includes a sequence number of each of said data frames; and changing the value of the ciphering key at least at the transmission of each of said data frames.

2. A method according to claim 1 wherein a data transfer connection is formed between two or more data transfer devices connected to the data communication system, wherein a separate ciphering key is allocated to each connection, in which case in a common data transfer channel, data frames of at least two separate connections are transferable in ciphered mode independent of each other.

3. A method according to claim 1 wherein a group of said data frames is divided into sub-blocks, wherein synchronization data comprises a block counter which is allocated separately to each connection and to which an initial value is set at a start of a connection and a value of which is changed at a transmission of each of said sub-blocks.

4. A method according to claim 1 wherein data frames are formed at an adapting layer.

5. A method according to claim 4, wherein data frames of the adapting layer are transferred to a tile link layer wherein data frames of the tile link layer are formed from data frames of the adapting layer for transmission to a transmission path.

6. A method according to claim 5, wherein synchronization data comprises at least one of the following:

data frame number of the tile link layer, data frame number of the adapting layer, identity of a routing area, identity of an area of a packet switching controller, and identity of a cell.

7. A method according to claim 6, wherein a data frame number is formed and maintained locally in data transfer devices linked to a data transfer connection in which case the sequence number is set to its initial value at a start of the data transfer connection and is updated in a previously defined manner during the connection.

8. A method according to claim 7, wherein the data transfer connection is a data transfer connection of a packet switching system.

9. A method according to claim 7, wherein the data transfer connection is a Point-to-Point connection.

10. A method according to claim 7, wherein the data transfer connection is a multipoint connection.

11. A method according to claim 10, wherein there are a plurality of data transfer connections including said data transfer connection, and information is transferred between a file data transfer device of a data service provider and data transfer devices of data service users, wherein a ciphering key (allocated separately to each of said data connections is set to respective ones of the data transfer devices by transferring the ciphering key in a ciphered mode in the data communication system, by using a keypad of a data transfer device.

12. A method according to claim 11, wherein only data transmitted from the data transfer device of a data service provider to data transfer devices of data service users is ciphered at least partly, only data transmitted from data transfer devices of data service users to the data transfer device of data service provider is ciphered at least partly, or data transmitted in both directions is ciphered at least partly.

13. A method according to claim 12, wherein at a start of ciphering, data, concerning a direction in which data transfer is ciphered, is transmitted to data transfer devices.

14. A method according to claim 10 wherein there are a plurality of data transfer connections including said data transfer connection, and information is transferred between a file data transfer device of a data service provider and data transfer devices of data service users, wherein a ciphering key allocated separately to each of said data connections is set to respective ones of the data transfer devices by transferring the ciphering key in a ciphered mode in the data communication system, by using a smart card.

15. A method according to claim 6, wherein a data frame number of the link layer is maintained in one data transfer device of a data transfer connection and is delivered to other data transfer devices in a data frame of the link layer.

16. A method according to claim 1, wherein only some part of the data frames of an adapting layer is ciphered, in which case data of a ciphering of each of said data frames is transmitted in the header field of the respective data frame.

17. A data communication system which comprises means for encryption of information transferred between data transfer devices, means for forming one or more data packets of the information and means for forming data frames of the data packets, the means for encryption of information comprise at least:

means for ciphering data packets by a ciphering key, means for changing a value of the ciphering key for each of a plurality of transmission blocks;

means for attaching synchronization data to data frames, means for changing the value of the synchronization data (COUNT) at the transmission of each data frame, wherein the synchronization data includes sequence numbers of respective ones of the data frames, and means for interpreting synchronization data in the data transfer device of the receiver.

18. A data communication system according to claim 17, characterized in that the data transfer devices comprise at least one mobile station.

19. A data communication system according to claim 18, characterized in that the mobile station is a GSM mobile station.

20. A data communication system according to claim 17, characterized in that the data transfer devices comprise at least one base station.

21. A data communication system according to claim 20, characterized in that the base station is a GSM base station.

* * * * *